Feb. 9, 1943.                     F. S. CALLENDER                     2,310,514
                          THERMOSTATIC STORAGE BATTERY CONTROL
                              Filed March 19, 1941          2 Sheets-Sheet 1

Inventor
Frank S. Callender
By J. S. Murray
Attorney

Feb. 9, 1943. F. S. CALLENDER 2,310,514
THERMOSTATIC STORAGE BATTERY CONTROL
Filed March 19, 1941 2 Sheets-Sheet 2

Inventor
Frank S. Callender
By
J. S. Murray
Attorney

Patented Feb. 9, 1943

2,310,514

UNITED STATES PATENT OFFICE 2,310,514

THERMOSTATIC STORAGE BATTERY CONTROL

Frank S. Callender, Detroit, Mich.

Application March 19, 1941, Serial No. 384,100

2 Claims. (Cl. 171—314)

This invention relates to automatic regulation of storage battery charging, particularly in motor vehicle electrical systems comprising a generator and storage battery.

It is well known that charging of a storage battery at an unduly high rate is detrimental, a primary deterient being abnormal temperature rise and resultant warping of the plates, carbonization of separators, and loosening of active paste coatings, with resultant shedding of the active material. Permissible rate of charge is a maximum when the battery is "low" and progressively decreases as the battery approaches full charge. It is usual in an automotive generating system to employ an automatic regulator taking effect on the generator to reduce its output if latter becomes excessive. Such regulators, however, are practically independent of temperature conditions, and involve mechanism that occasionally gets out of order, or may be prevented from functioning properly by a careless or unskilled adjustment.

Installation of a motor vehicle storage battery beneath the engine hood is common modern practice and such installation, under operating conditions, materially reduces the margin between a normal and abnormal battery temperature. If proper circulation of cooling air through the hood fails for any reason, particularly in warm weather, the battery temperature may rise abnormally, even when present type of generator regulator is functioning perfectly.

An object of the invention is to fully safeguard a motor vehicle storage battery from abnormally high temperatures by permanently installing in or upon the battery a thermostatic switch responding to undue temperature rise by interrupting the normal charging circuit.

Another object is to predeterminedly increase the resistance of the charging circuit by action of said thermostatic switch and thus reduce the charging current to a desired safe maximum.

A further object is to adapt said switch to so take effect on the generator field as to predeterminedly reduce the current output.

A further object is to combine an old type of electromagnetic regulator for the generating system of a motor vehicle with a thermostatic regulator responding directly to battery temperature.

These and various other objects of the invention are attained by the construction hereinafter described and illustrated in the accompanying drawings, wherein.

Figure 1:
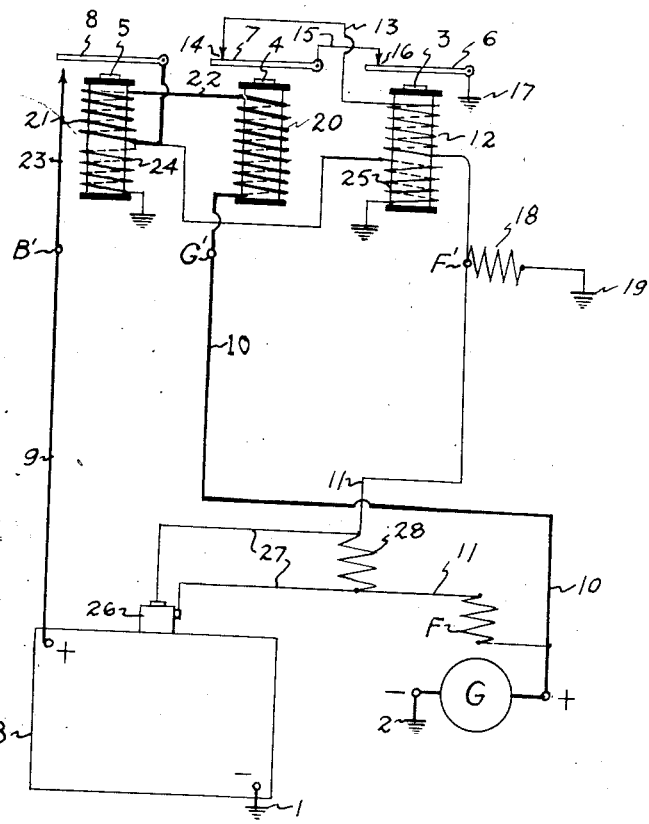
Fig. 1 is an electrical diagram of a generating system equipped with a common type of regulator for the generator output and also with my improved thermostatic regulator.

In the several diagrams, the reference character B designates a storage battery, and G a generator for charging such battery. The generator is preferably shunt wound, its field being indicated at F. Negative terminals of the battery and generator are shown grounded at 1 and 2 conforming to common practice.

Various types of electro-magnetic regulators are in use to prevent generation of a detrimentally high voltage or current or both at high generator speeds, such regulators controlling the rate of charge of the battery and also safeguarding the load from excessive voltage. The illustrated electro-magnetic regulator comprises cores 3, 4 and 5 and corresponding armatures 6, 7 and 8, and has three terminals B', G', and F' connected respectively to the positive terminal of the battery, the positive terminal of the generators, and to the generator field by leads 9, 10 and 11. A winding 12 on the core 3 is connected at one end to the terminal F' being thus in series with field F, the other end of said winding leading through a conductor 13 to a contact point 14 normally engaged by the armature 7. The latter is connected by a lead 15 to a contact point 16 normally engaged by the armature 6 which is grounded at 17. To the terminal F' is further connected a resistance coil 18, grounded at 19.

Windings 20 and 21 respectively on the cores 4 and 5 are series connected at 22, and are further respectively connected to the terminal G' and to the armature 8, and the latter is normally spaced from a contact point from which the conductor 23 leads to the terminal B'. Series connected with the winding 21 and in parallel with each other are two relatively high resistance windings 24 and 25, one on the core 5 and the other on the core 3, each of said high resistance windings being grounded.

In functioning of described regulator, the armature 8 is attracted by the core 5 to establish a battery charging circuit, when the generator voltage reaches a predetermined value such as to deliver a minimum required current through the winding 24. When the generator voltage reaches a predetermined upper limit, current flow in the winding 25 becomes adequate, in its magnetizing effect, to draw down the armature 6, thus breaking the normal field circuit. The field circuit can then only be established through the resistance 18, which results in material weakening of the field and a consequent reduction of generator voltage. Magnetizing effect of the rewinding 25 is hence so reduced as to allow release of the armature 6, which again establishes the normal circuit. Rapid repetition of this cycle tends to keep the generator voltage at a desired value.

Heavy load, together with a "low" battery, prevents excessive rise of generator voltage and under such conditions regulation of current output is necessary. The winding 20 provides such regulation, the magnetic effect of such winding being adequate, at a predetermined maximum current value, to draw down the armature 7 and break the normal field circuit of the generator. The field then is weakened by inclusion of the resistance 18 in its circuit, with resulting reduction of generator output and weakening of magnetic effect of the winding 20, so that the armature 7 is again released. Rapid repetition of this cycle limits the generator to a predetermined maximum amperage.

The regulator above briefly described is not new and is disclosed merely to exemplify one of the various present types of regulation which may be supplemented by the improved regulator. As disclosed in Fig. 1, the improvement is as follows.

Permanently installed on the battery B, in any desired manner, is a thermostatic switch 26, subject to the interior temperature of the battery. Said switch is normally closed and controls a circuit 27, which in parallel with a resistance 28, is interposed in the lead 11. Under normal temperature conditions in the battery, the field circuit is closed through the thermostatic switch, this being true whether or not the field is weakened by the electro-magnetic regulator. If the battery temperature rises abnormally, as for example to 135 degrees, Fahrenheit, the switch 26 opens and the resistance 28 then takes effect on the field circuit, materially weakening the field and correspondingly reducing the generator output. When the battery regains its normal temperature, the thermostatic switch again closes, eliminating the resistance 28.

It is to be noted that the resistance 18 is in series with the resistance 28 in field circuit, when the switch 26 is open, said circuit being then traced as follows: positive terminal of generator, field F, lead 11 including resistance 28, terminal F', resistance 18, grounds 19 and 2, and negative terminal of generator.

Figure 2:
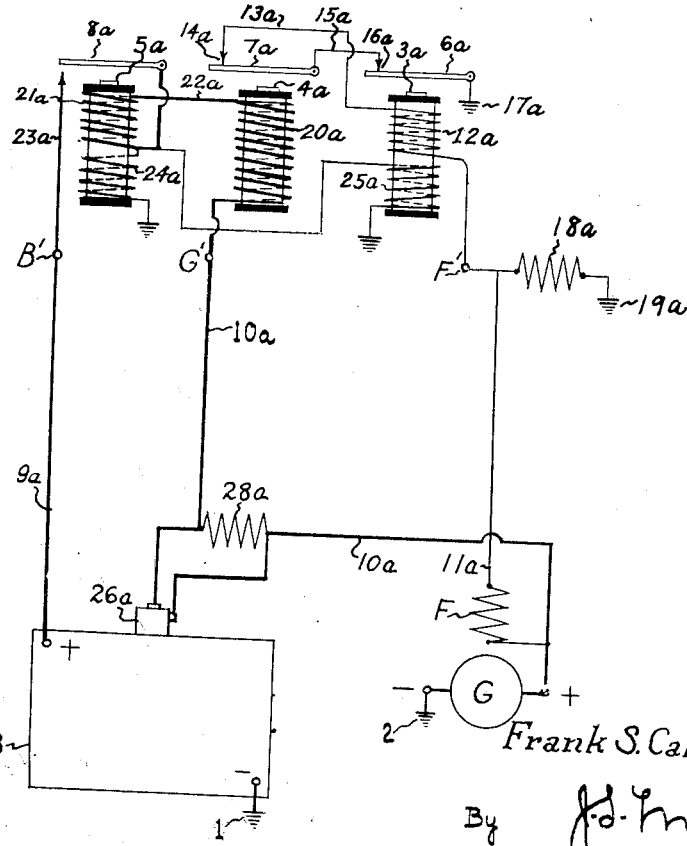
Fig. 2 is a similar diagram, showing a modified thermostatic regulation of the generator.

In the invention as diagrammed in Fig. 2, the electro-magnetic regulator, the battery and the generator conform to the foregoing description. The leads 9a and 11a, however, are both direct, and the thermostatic switch 26a and resistance 28a take effect on the lead 10a, being arranged in parallel in said lead. Normally the switch is closed affording a path of negligible resistance to the current delivered by the generator. Upon abnormal rise of the battery temperature, the switch opens and the current flow is then materially reduced by the resistance 28a. This regulation is again independent of that effected by the electro-magnetic regulator.

Figure 3:
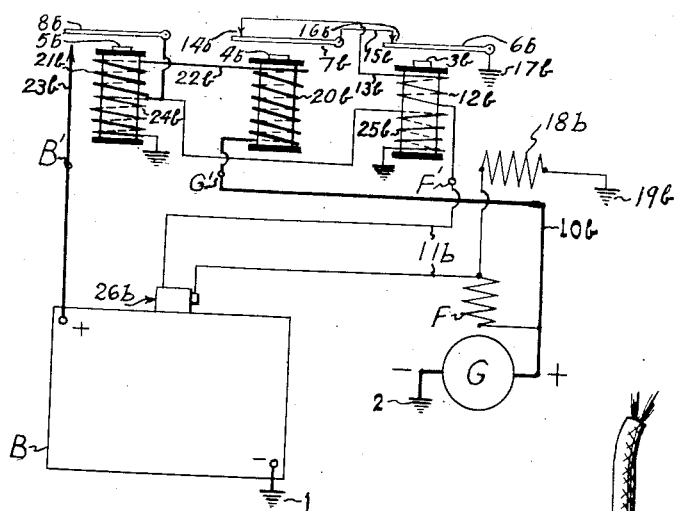
Fig. 3 is a similar diagram showing how a definite resistance may be rendered effective by either the electro-magnetic or thermostatic regulator to weaken the generator field.

The invention as diagrammed in Fig. 3 differs from the showing of Fig. 1 only in that no special resistance is provided in the lead 11b which connects the field F and terminal F' and which is controlled by the thermostatic switch 26b. When said switch opens due to an abnormally high battery temperature, the field current must flow through the same resistance coil 18b as receives said current responsive to operation of the electro-magnetic regulator. Thus in this arrangement, the same resistance coil serves the purpose of both regulators in weakening the generator field when regulation is applied.

Figure 4:
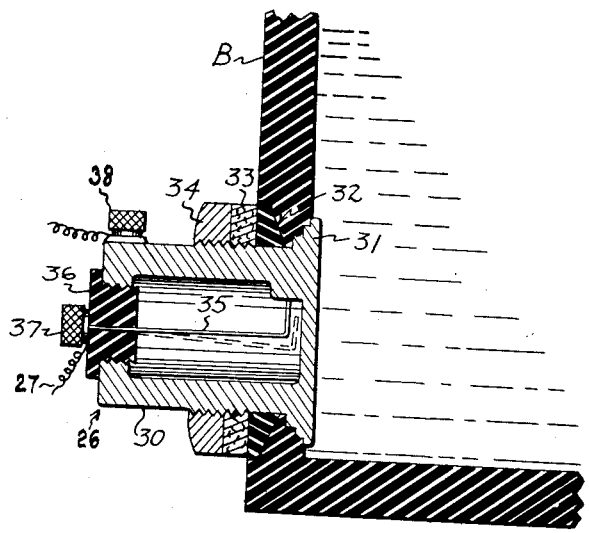
Fig. 4 is a fragmentary vertical sectional view showing installation of the thermostatic switch in the battery.

In Fig. 4 is illustrated one of various provisions which may be made for installing the thermostatic switch in the battery. Through an opening drilled or otherwise formed in the lower portion of the battery box there is snugly fitted the cylindrical switch housing 30 formed of acid-resistant metal, such as lead, and terminally flanged at 31 to seat interiorly against the box. Pitch or the like 32 fills a counter-bored outer portion of the opening receiving said housing to form a seal against leakage of the electrolyte and a further seal is established by packing 33 compressed against the pitch by a nut 34 threaded on the housing exteriorly of the battery. A switch arm 35 carried by the outer end of the housing in an insulating plug 36 normally contacts the housing adjacent to the inner end thereof. Binding nuts 37 and 38 serve respectively to connect conductors to the outer end of the arm 35 and to the housing 30. Said arm is designed to flex clear of the housing, as shown in dash lines in Fig. 4, when its temperature rises to a predetermined value, this characteristic being derived by a bimetallic construction of the arm or in any other well known manner.

Figure 5:
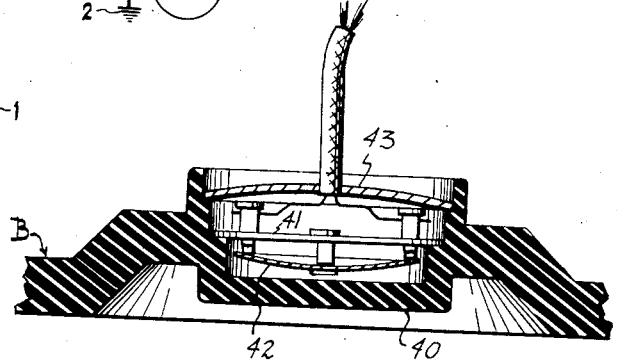
Figure 5 is a fragmentary vertical section of a cover portion of a battery casing, showing how the cover may carry a thermostat.

In construction shown in Fig. 5, the casing of the battery B has its cover formed with a depending cup portion 40, proportioned to receive a disk type of thermostatic switch 41. The latter is seated on an annular shoulder of said cup portion, and comprises a diaphragm 42 normally in the illustrated circuit-closing position, and adapted to flex to open-circuit position upon a predetermined temperature rise. Said cup portion may be provided with a suitable closure for its upper end such as illustrated Welch plug 43.

The term "casing," as employed in following claims, is inclusive of the battery cover or top.

What I claim is:

1. In a thermostatic battery control, the combination with a storage battery, a generator for charging said battery including a shunt field, a resistance in series with said field for regulating the field strength, a circuit series-connected to the field for energizing the field independently of said resistance, a normally closed thermostatic switch controlling said circuit and subject to the internal temperature of the battery and adaped to open upon a predetermined rise of said temperature, and means for breaking said circuit responsive to an excessive rise of the generator output.

2. In a thermostatic battery control, the combination with a storage battery, a generator for charging said battery including a shunt field, a resistance in series with said field for regulating the field strength, a circuit series-connected to the field for energizing the field independently of said resistance, a normally closed thermostatic switch controlling said circuit and subject to the internal temperature of the battery and adapted to open upon a predetermined rise of said temperature, and an electro-magnetic switch for breaking said circuit responsive to an excessive rise of the generator output, the field coil of said switch being included in said circuit.

FRANK S. CALLENDER.